7 Sheets—Sheet 1.

G. JOHNSTONE.
Knitting Machine.

No. 229,709. Patented July 6, 1880.

Witnesses
Henry Howson Jr.
Harry Smith

Inventor
George Johnstone
by his Attorneys
Howson and Son

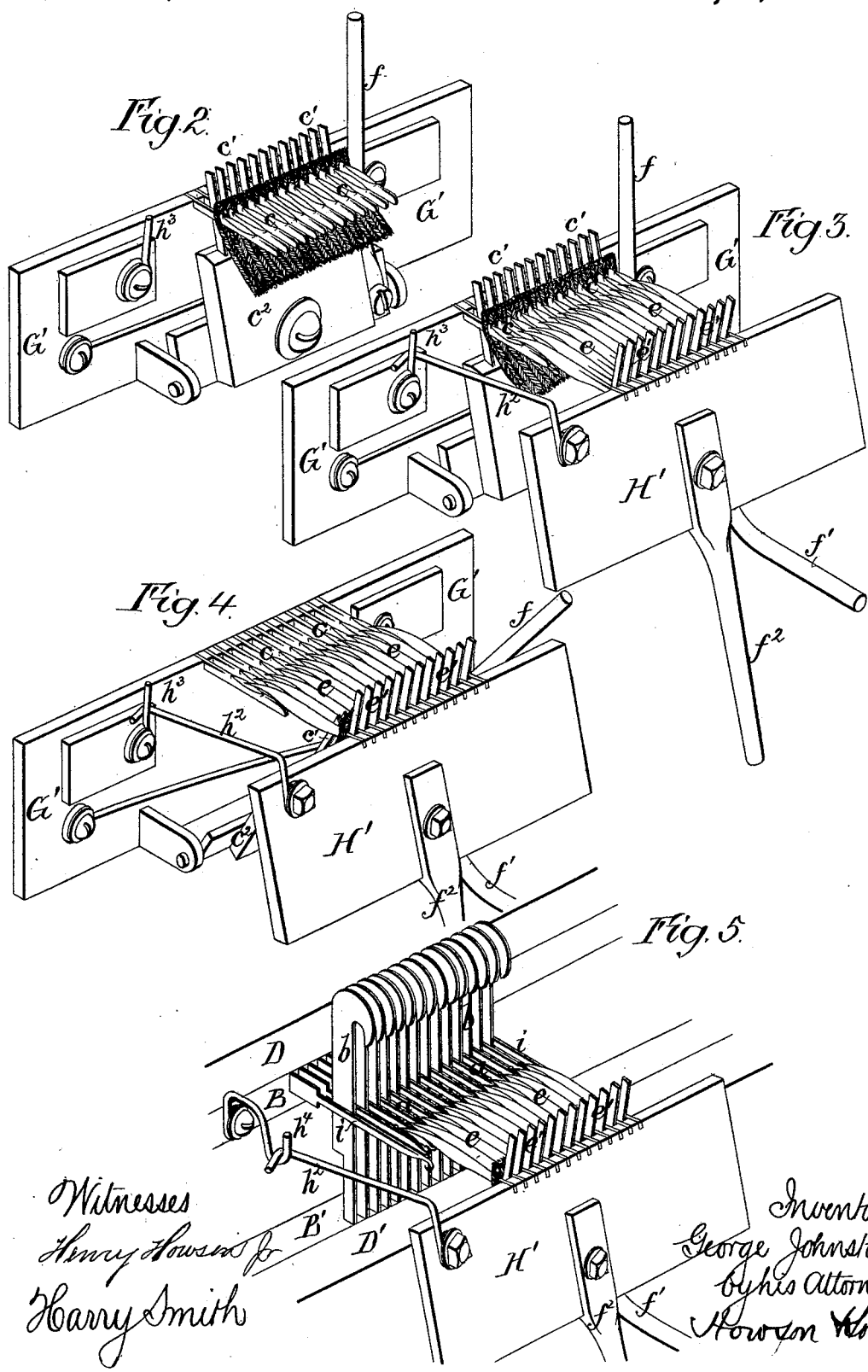

7 Sheets—Sheet 3.
G. JOHNSTONE.
Knitting Machine.
No. 229,709. Patented July 6, 1880.
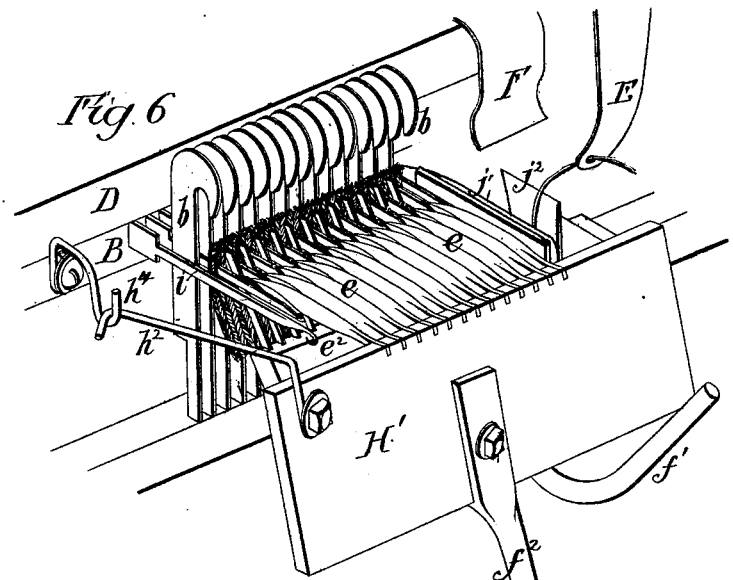
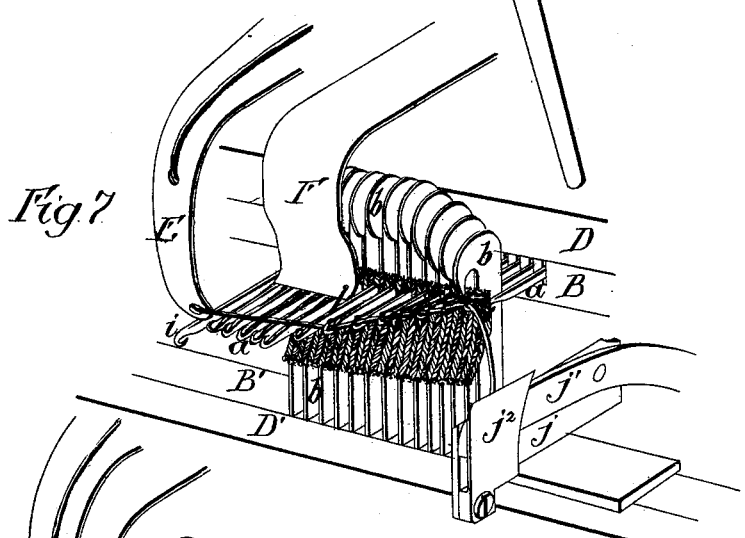
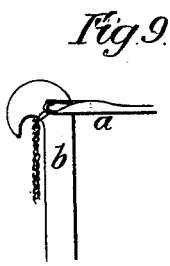
Fig.9.
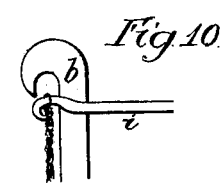
Fig.10.
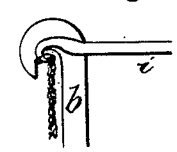
Fig.11.
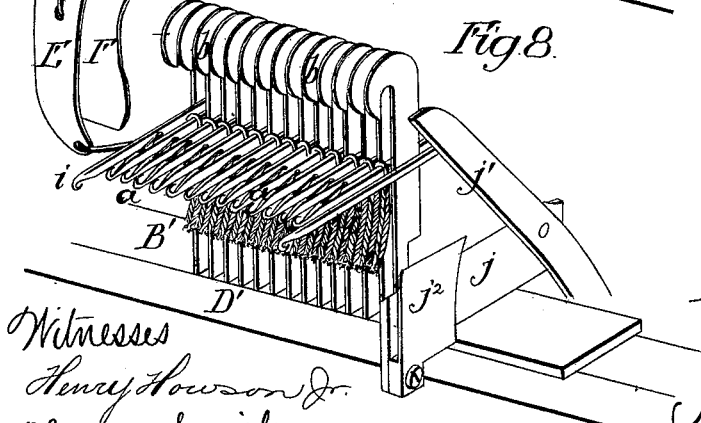
Fig.12.
Witnesses
Henry Howson Jr.
Harry Smith
Inventor
George Johnstone
by his Attorneys
Howson and Son
N. PETERS, PHOTO-LITHOGRAPHER, WASHINGTON, D. C.

7 Sheets—Sheet 4.

G. JOHNSTONE.
Knitting Machine.

No. 229,709.  Patented July 6, 1880.

Witnesses
Henry Howson Jr.
Harry Smith

Inventor
George Johnstone
by his Attorneys
Howson & Son

G. JOHNSTONE.
Knitting Machine.
No. 229,709. Patented July 6, 1880.
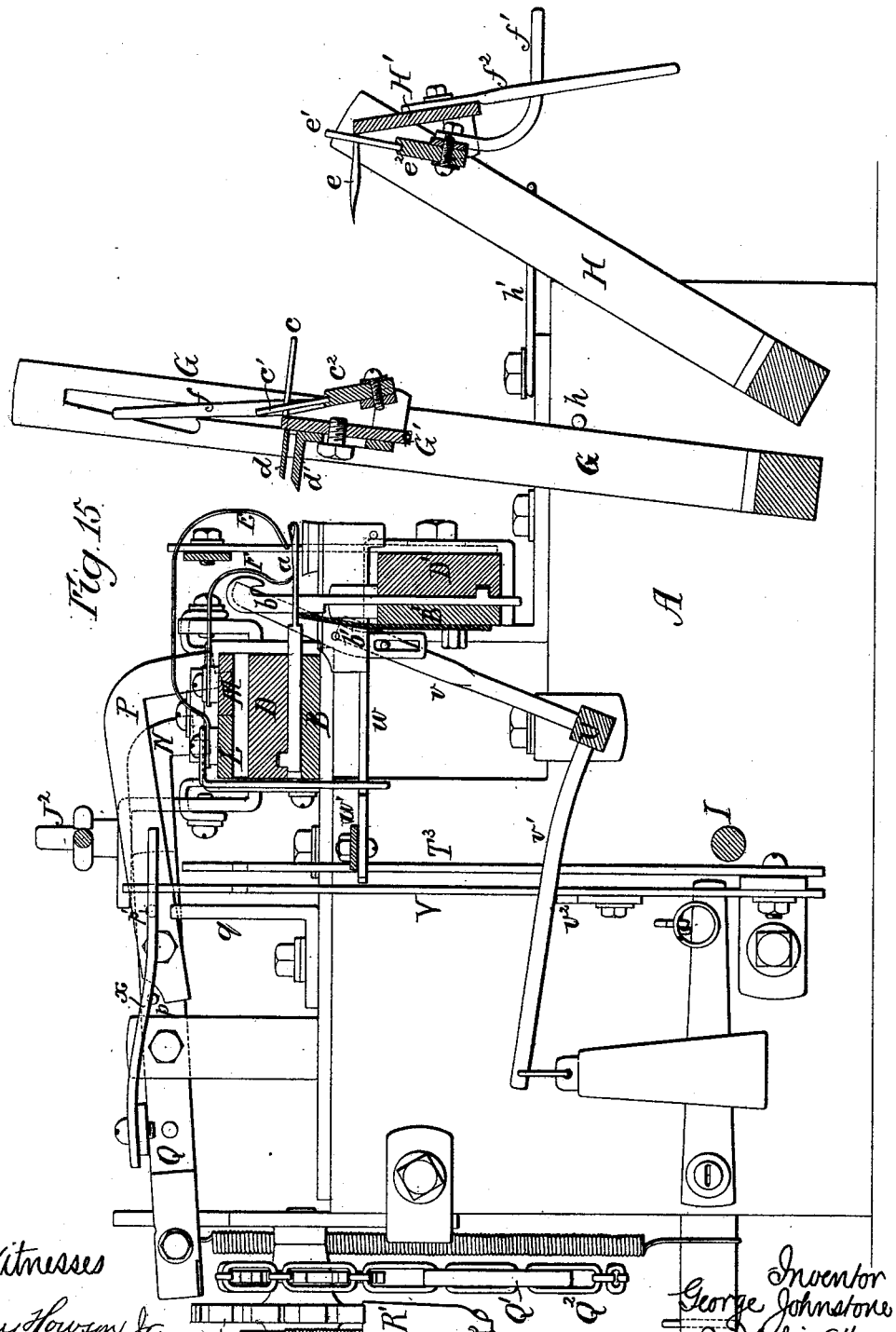

G. JOHNSTONE.
Knitting Machine.

No. 229,709.

7 Sheets—Sheet 6.

Patented July 6, 1880.

Witnesses
Henry Howson Jr.
Harry Smith

Inventor
George Johnstone
by his Attorneys
Howson and Son

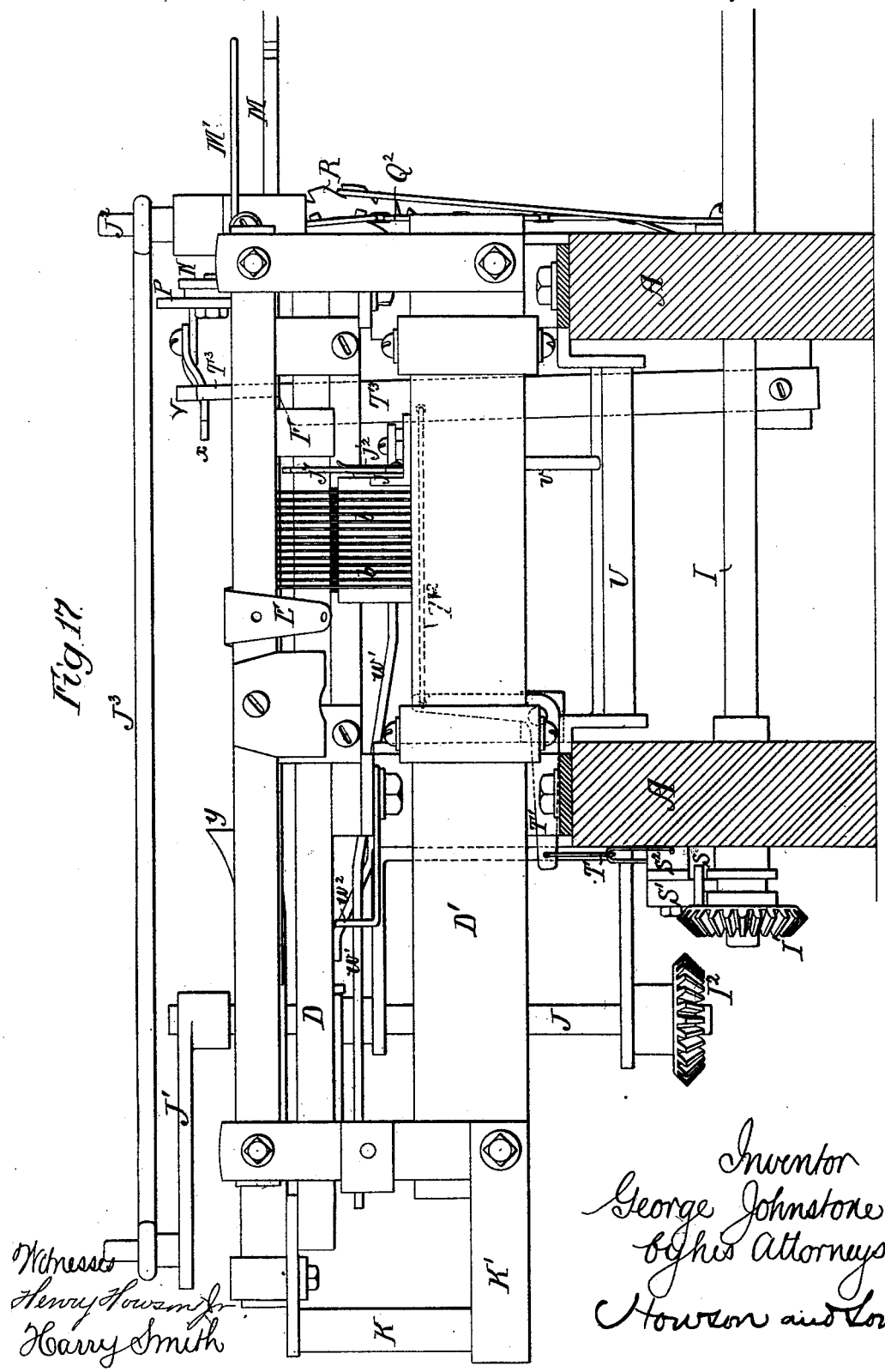

UNITED STATES PATENT OFFICE.

GEORGE JOHNSTONE, OF PHILADELPHIA, PENNSYLVANIA.

KNITTING-MACHINE.

SPECIFICATION forming part of Letters Patent No. 229,709, dated July 6, 1880.

Application filed October 21, 1879.

*To all whom it may concern:*

Be it known that I, GEORGE JOHNSTONE, of Philadelphia, Pennsylvania, have invented a new and useful Improvement in Knitting-Machines, of which the following is a specification.

My invention relates to certain improvements in what are known as "finishing-machines"—that is to say, machines to the needles of which a piece of fabric partially completed in a separate machine is applied for the completion of the knitting operation.

The main objects of my improvements are to facilitate the application of the partially-knitted fabric to the needles of the finisher, to dispense with tension-weights on the fabric or on the thread, and to automatically cast off the work and stop the machine when the proper number of courses have been knitted. These objects I attain in the manner which I will now proceed to describe, reference being had to the accompanying drawings, in which—

Figure 1:
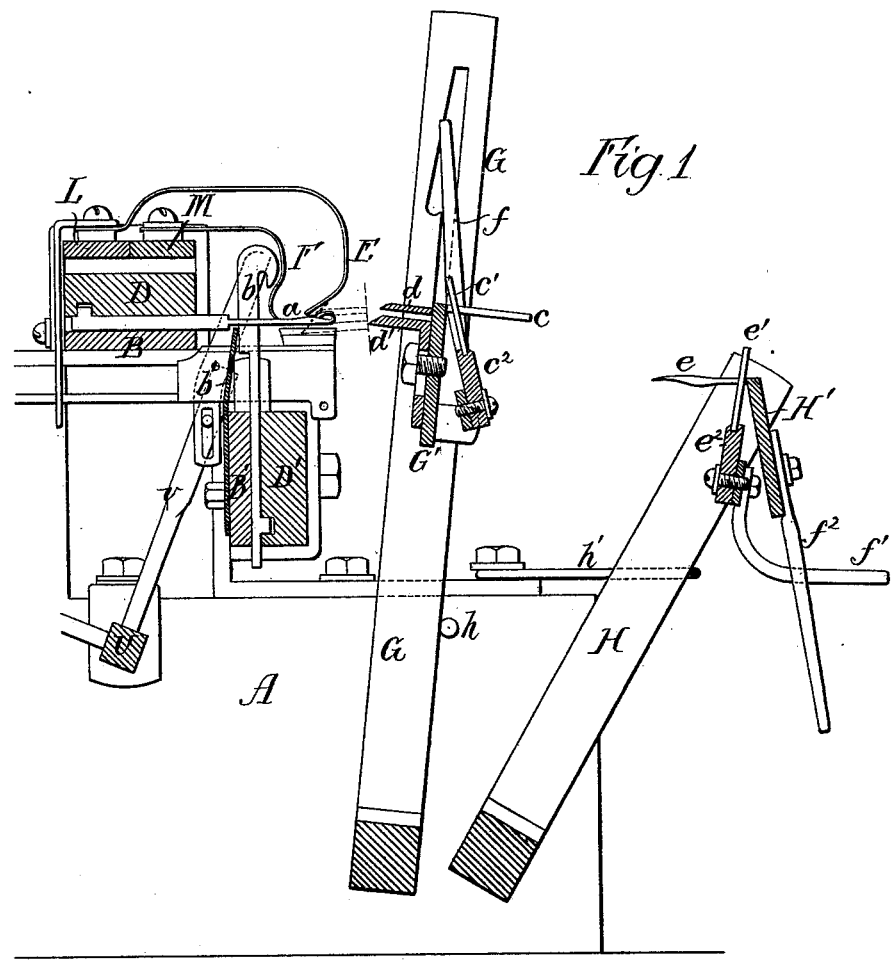
Figure 13:
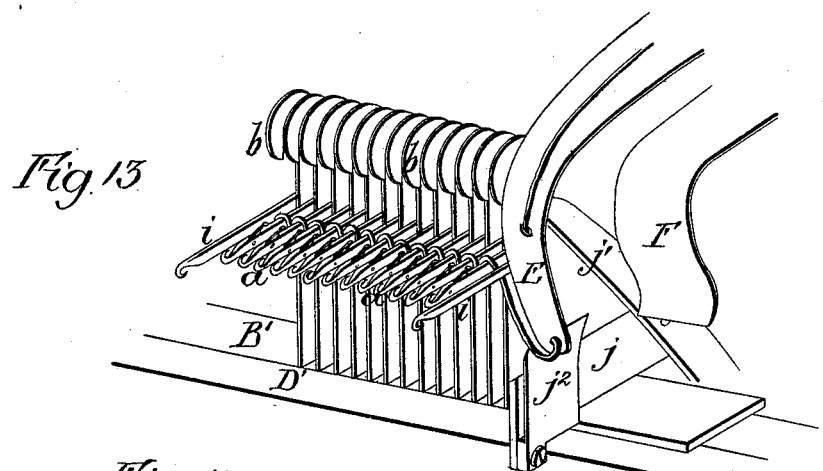
Figure 14:
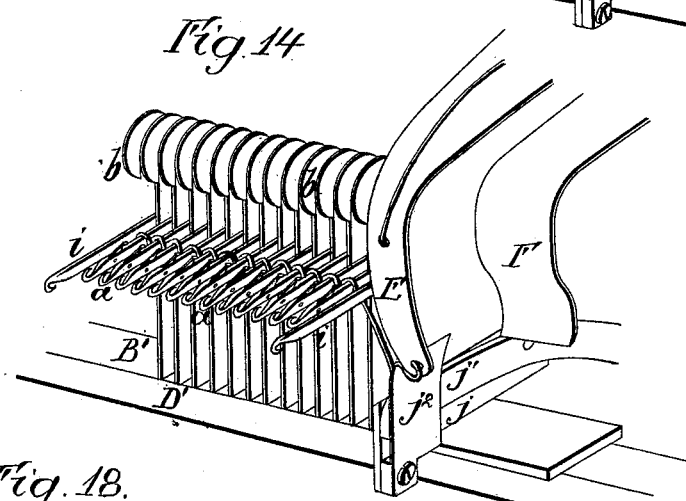

Figure 1, Sheet 1, is a sectional view, and Figs. 2 to 5, Sheet 2, Figs. 6 to 8, Sheet 3, and Figs. 13 and 14, Sheet 4, perspective views, of my improved devices for applying a piece of fabric to the needles of the finisher and knitting the required addition thereto; Fig. 15, Sheet 5, Fig. 16, Sheet 6, Fig. 17, Sheet 7, Figs. 18 and 19, Sheet 4, and Fig. 20, Sheet 1, being views of the machinery whereby the proper movements are imparted to the devices shown in Figs. 1 to 14.

I will first describe the construction and operation of those parts of the machine shown in Figs. 1 to 14, reserving to the latter part of the specification the description of the machinery shown in Figs. 15 to 20.

A is the frame-work of the machine, across the front portion of which extend two transverse bars, B and B', the former guiding the stems of a number of horizontal latch-needles, $a$, while the latter guides the stems of a number of vertical hooked bars, $b$, arranged in the spaces between the shanks of the needles.

The needles $a$ are reciprocated, in the usual way, by means of a cam-slot in a bar, D, acting upon lugs on the stems of the needles, and the hooked bars $b$ are elevated and depressed, in a similar manner, by means of a cam-slot in a bar, D'. The latter slot, however, is so arranged in respect to the slot in the bar D that each hooked bar $b$ will commence to descend as soon as the needle adjacent to which it is arranged has almost reached the limit of its inward movement, and will commence to ascend as soon as said needle has almost reached the limit of its outward movement.

To the inside of the bar B' is secured a plate, $b'$, the upper edge of which extends up to within a short distance of the shanks of the needles $a$, as shown in Fig. 1.

E is the thread-guide, carried by a bar, L, and F is a bent plate, carried by a bar, M, and serving as a latch-turner, in the manner hereinafter described.

To the frame of the machine, in front of the needles, is hung an upright frame, G, and to slots in the latter are adapted the ends of a transverse plate, G', which can be moved vertically from a position at the bottom of the slots, as in Fig. 1, to the upper portion of the slots, where it is retained by an offset found in the latter, or by other suitable means. This plate G' carries at the top and in front a number of bars, or, as they are technically termed, "points," $c$, recessed on the top, as usual, and to the spaces between these points are adapted a number of fingers, $c'$, carried by a bar, $c^2$, which is pivoted to bearings on the plate G'. From the rear edge of this plate G', near the top of the same, projects a sharp-edged plate, $d$, and beneath the latter is a vertically-adjustable bar, $d'$, for a purpose hereinafter explained.

In front of the frame G is another pivoted frame, H, to which, near the upper end, is hung a transverse plate, H', carrying a number of "coverers," $e$, pointed at the ends and recessed on the under side, as usual; and to the spaces between these coverers are adapted fingers $e'$, similar to the fingers $c'$, and secured to a bar, $e^2$, pivoted to the frame H. The same number of points $c$ and coverers $e$ are employed as there are needles on the frame B.

The bar $c^2$ is provided with an arm, $f$, by which it may be vibrated, and the bar $e^2$ is provided with a similar arm, $f'$, for a like purpose. The frames G and H may also be vibrated, the former by a suitable handle at the side or top and the latter by means of an arm, $f^2$, secured to the plate H', undue forward movement of the frame G being prevented by a pin, $h$, projecting from the inside of the frame A, while the forward movement of the frame H is restricted by a bent bar, $h'$, secured to said frame.

On the plate H' is a hooked arm, $h^2$, which may, under the circumstances described hereinafter, be adapted either to a pin, $h^3$, on the plate G', Fig. 3, or to a hook, $h^4$, on the needle-bar. (See Fig. 5.)

At each end of the row of needles $a$ is arranged a stem, $i$, having at the end a downwardly-bent hook, these hooked stems being advanced and retracted in the same manner as the needles, and serving as selvage-holders, in a manner hereinafter set forth.

At one end of the row of needles is a pair of shears, the lower blade, $j$, of which is fixed, while the upper blade, $j'$, can be raised and lowered under control of suitable mechanism, and adjacent to the lower blade, $j$, is arranged a spring-plate, $j^2$.

The operation of the above-described parts is as follows: The frames G and H and the parts carried by the same are adjusted to the positions shown in Fig. 1, and the needles $a$, hooked bars $b$, guide E, latch-turner F, and shears are in the positions shown in Fig. 6, the end of the thread from the guide E being retained between the upper jaw, $j'$, of the shears and the spring-plate $j^2$. The partially-completed piece of fabric is first pushed over the points $c$, as shown in Fig. 2, after which the frame H is swung forward and its plate H' so operated as to adapt the coverers $e$ to the points $c$, as shown in Fig. 3, the ends of the coverers resting in the recesses in the tops of the points. The frame H is retained in this position by the hooked arm $h^2$, which is adapted to the pin $h^3$ on the plate G'. The bar $c^2$ is then vibrated by means of its arm $f$, so that the fingers $c'$ press the fabric from the points $c$ and transfer it to the coverers $e$, as shown in Fig. 4. The plate H' is then released from the plate G' and the frame H restored to its former position, the frame G being afterward swung forward, so that its plate $d$ will turn back the latches of all the needles $a$, (see dotted lines, Fig. 1,) the bar $d'$ supporting the ends of the needles and preventing the bending down of the same during this operation. The frame G is then retracted and the plate G' elevated and retained in the upper portion of the slots in the frame, the frame H being then brought forward and the coverers $e$ adapted to the needles in the same manner as they were formerly adapted to the points $c$, the frame H' being secured to the needle-bar by the bar $h^2$ and hook $h^4$. (See Fig. 5.) The frame $e^2$ is now operated so as to cause the fingers $e'$ to transfer the fabric onto the needles $a$, as shown in Fig. 6, the frame H being then released and moved back out of the way.

It should be understood that the cam-groove in the bar D has a straight portion of sufficient length to permit the bringing of all of the needles into a horizontal line for the application of the fabric thereto, as set forth.

The guide E and plate F now move across the machine, the guide laying the threads in the hooks of the needles and the plate F following and turning over the latches, as shown in Fig. 7. The use of this latch-turner is necessary in forming the first course of stitches, because the upper edge of the fabric applied to the needles projects considerably above them, and therefore would, in the absence of the plate F, have a tendency to catch the ends of the latches and prevent the proper operation of the same on the inward movement of the needles.

As the thread is laid in the hooks of the needles they are retracted and draw a loop through the fabric, the hooked bars $b$ then descending, so as to draw down said fabric and hold it firmly in position, as shown in Fig. 9. Any tendency of the yarn or fabric and bars $b$ to bend down the ends of the needles is resisted by the plate $b'$, which supports said needles.

The fabric is held down while the needles move forward, and until they have reached the limit of their forward movement and no longer exert any strain, the bars $b$ rising as the needles reach the forward position. By this means tension-weights on the fabric are avoided and the formation of loose loops thus permitted, so that the full elasticity of the yarn is preserved in the fabric and a close and uniform appearance imparted to the latter.

After the first course of stitches has been formed the parts are in the position shown in Fig. 8, the thread from the edge of the fabric passing under one of the selvage-hooks $i$, so that on the return movement of the guide E, in order to form a fresh course of stitches, a loop will be formed around said hook. A loop of this sort is formed around one of the hooked stems $i$ after the formation of each row of stitches, in order to provide at each edge of the knitted fabric slack thread, which is absorbed by the selvage row of stitches, so that a full, straight, and even appearance is imparted to the selvage of the fabric.

The mode of casting the loops off the selvage-hooks $i$ is shown in Figs. 10, 11, and 12, on reference to which it will be seen that when the hook is first retracted the loop is on the upper part of the same, as shown in Fig. 10. As the hooked bar $b$ descends, however, the pull upon the upper edge of the fabric causes the loop to slip down onto the lower portion of the hook, as shown in Fig. 11, so that when the hook again moves forward it slips out of the loop, as shown in Fig. 12.

After the formation of the first row of stitches in the machine, as above described, the plate F, having been restored to the position in Fig. 6, is retained in that position until it becomes necessary to form the first row of stitches in connection with a fresh piece of fabric, when the said plate F is again operated as before.

During the formation of the first row of stitches the shears $j\ j'$ were opened, and at the end of the formation of every two rows of stitches—that is, when the guide E is in the position shown in Fig. 13—the thread is carried between the blades of the shears. When the desired number of courses have been knitted the movement of the guide E is stopped and the blades of the shears closed, thereby cutting off the thread, so that on the next operation of the needles they will cast off their loops and the fabric will be released, the needles being then free for the reception of another uncompleted strip of fabric, the end of the thread being retained between the shears and the spring-plate $j^2$, and the guide E and plate F being in position for repeating the operation above described.

It should be understood that the uncompleted sections of fabric are applied to the points $c$ and transferred to the coverers $e$ during the operation of the needles $a$, so that one operative can attend to a number of machines. For instance, a dozen machines may be arranged side by side, and sections of fabric applied to the points and transferred to the coverers of the entire number of these machines while the first machine is completing the desired number of courses of stitches.

The fabric is applied to the points $c$, instead of being applied directly to the coverers, because the operation can be performed much more rapidly and easily by pushing the fabric in the direction of the points than by drawing it in the direction of the coverers.

Barbed needles may be substituted for the latch-needles in some cases, some of the parts being, of course, modified to accord with this change.

Figure 20:
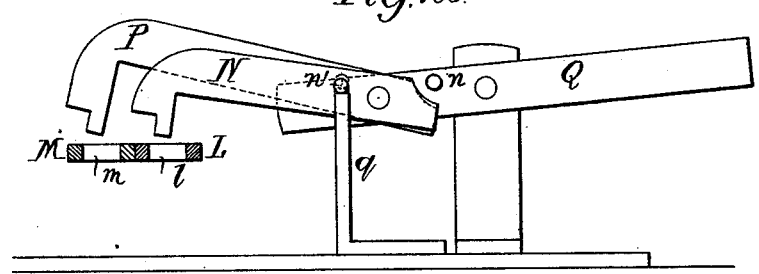
Figure 18:
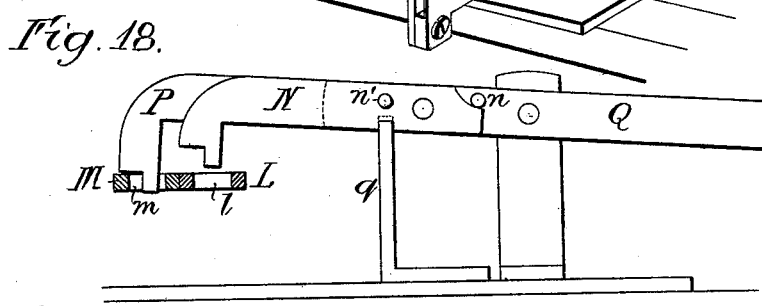
Figure 19:
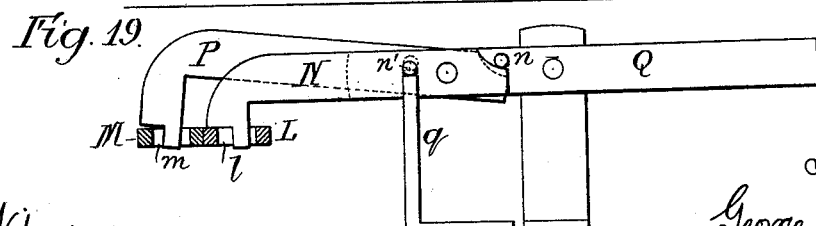
Figure 16:
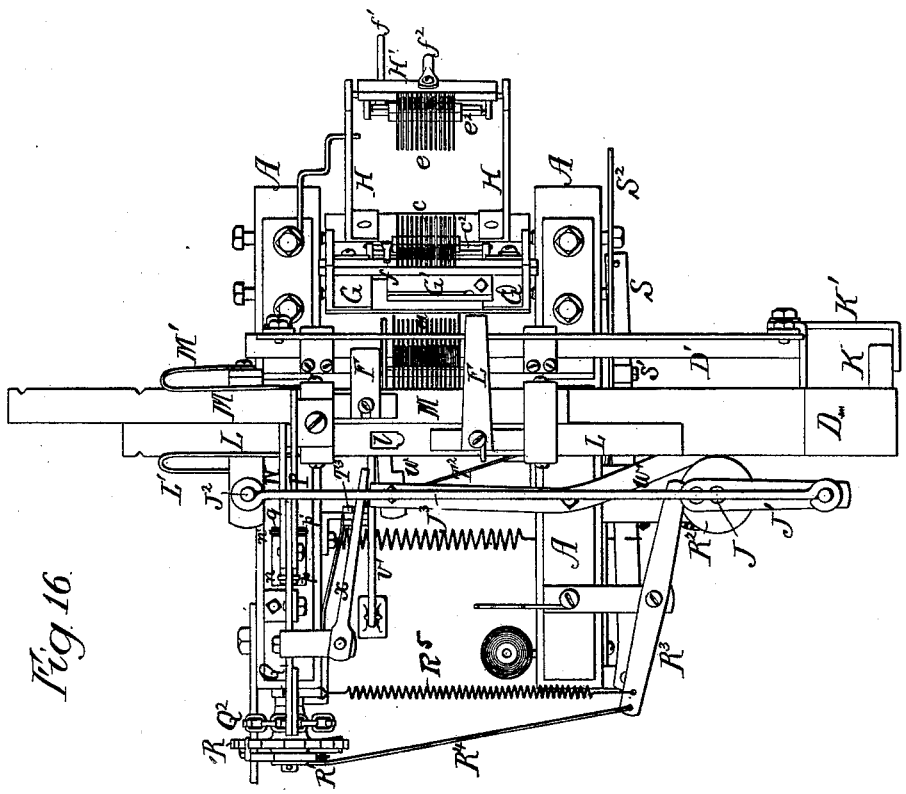

The machinery whereby the proper operation of the needles $a$, hooked retaining-bars $b$, guide E, latch-turner F, and shears is effected is shown in the transverse vertical section, Fig. 15, plan view, Fig. 16, longitudinal section, Fig. 17, and detached views, Figs. 18, 19, and 20.

I is the driving-shaft, which imparts movement, through the medium of a bevel-wheel, I', and pinion I², to a vertical shaft, J, carrying at the top a crank, J', the movement of which is transmitted to a stud, J², on the needle-operating bar D through the medium of a connecting-rod, J³.

The bar D is caused to operate the bar D' by means of a bent plate, K, secured to the end of said bar D, and projecting downward in line with the bar D', said plate K moving the bar D' in one direction by direct contact with the end of the same, and in the other direction by contact with a hooked arm, K', on the bar D'.

A space intervenes between the end of the bar D' and the hook of the arm K', so that the bar D always moves a short distance before commencing to operate the bar D', in order that the needles shall be retracted and advanced before the bars $b$ commence to descend or rise.

The guide E is carried by a bar, L, and the latch-turner F by a bar, M, the said bars L and M being arranged side by side above the bar D, and receiving their reciprocating motion from the same through the medium of spring-arms L' and M', adapted to notches in the edges of the bars L and M.

The bar L has an opening, $l$, and the bar M has a similar opening, $m$, and above the bars L and M, and at right angles thereto, are two levers, N and P, the long arm of the former being bent downward at the end and terminating at a point above the bar L, while the long arm of the lever P is similarly bent and terminates at a point above the bar M.

When the long arms of the levers N and P are raised the bars L and M are at liberty to be reciprocated by the bar D through the medium of the spring-arms L' and M'; but when the end of either of said long arms is depressed and adapted to the opening in its corresponding bar, said bar is locked in position and cannot be reciprocated, the spring-arm in such case slipping out of the notch in the bar and sliding along the side of the same.

The levers N and P are, in the present instance, hung to opposite sides of the short arm of a third lever, Q, the long arm of which is adapted to be acted upon by a cam, Q', on a pattern-chain, Q², which is operated by the ratchet-wheel R, the pawl R', by which the latter is rotated, receiving its motion from a cam, R², on the shaft J through the medium of a lever, R³, and connecting-rod R⁴, said lever R³ being acted upon by a spring, R⁵, as shown in Fig. 16.

The short arms of the levers N and P project beneath pins $n$ and $p$ on the lever Q, and the said levers N and P are provided with pins $n'$ and $p'$, arranged in line with a vertical post, $q$, forked at the upper end, so that the levers may enter said forked portion in order to bring the pins $n'$ and $p'$ in contact with the top of the post. By this means the simple elevation and depression of the long arm of the lever Q is caused to impart a variety of movements to the levers N and P, in a manner which will be best understood on reference to Figs. 18, 19, and 20. Thus in Fig. 18, which represents the long arm of the lever Q depressed to its fullest extent, as it is when the needles are in operation, the outer end of the lever N is elevated, so that the bar L, carrying the guide E, is free to reciprocate, but the outer end of the lever P is depressed so as to lock the bar M and hold the latch-turning plate F in position. When in this position the short arms of levers N and P bear against the pins $n$ and $p$ and the pin $n'$ and $p'$ are raised above the top of the vertical post $q$.

As the long arm of the lever Q is raised the first action will be to lower the outer end of the long arm of the lever N, as shown in Fig. 19, and as the movement of the lever Q is continued the long arms of both levers N and P will be lifted, as shown in Fig. 20, so as to release the bars L and M, owing to the fact that the pins $n'$ and $p'$ come into contact with the top of the post $q$.

As the cam passes from under the long arm of the lever Q said long arm falls and the parts are restored to the position shown in Fig. 18.

The reason that the long arm of the lever P is not raised in the same manner as the long arm of the lever N when the parts are in this position is, that the recess in the end of the short arm of the lever P, to which the pin $p$ is adapted, is somewhat deeper than the recess in the short arm of the lever N, so that said pin $p$ does not come into forcible contact with the short arm of the lever, and consequently does not raise the same.

The bevel-wheel I' is keyed to the shaft I so that it can slide thereon, and it is acted upon by a spring-arm, S, which tends to throw it out of gear with the pinion $I^2$, a block, $S'$, on a pivoted bar, $S^2$, serving to hold it in gear when the machine is in operation.

The bar $S^2$ is connected, by means of a link or chain, T, to one arm of a bell-crank lever, T', the other arm of which is connected by a rod, $T^2$, to an arm, $T^3$. (See Figs. 15 and 17.) The blade $j'$ of the shears is carried beyond the pivot of the same, and is slotted for the reception of a pin on an arm, $r$, carried by a shaft, U, which is also provided with an arm, $v'$, the latter, when the blades are open, resting on a lug, $r^2$, on a pivoted arm, V. The arm $v'$ is weighted at the outer end, so that when the lug $r^2$ is withdrawn from beneath the same it falls and causes the descent of the blade $j'$ of the shears.

The opening of the shears is effected by a notched arm, $w$, which is operated by the reciprocating bar D through the medium of the lever $w'$ and arm $w^2$.

The lever Q carries an arm, $x$, the outer end of which, as the long arm of said lever is raised, is brought into the path of a finger, $y$, on the needle-operating bar D, and is moved thereby so as to operate first the arm V, in order to release the weighted arm $r'$ and permit the closing of the shears, and then the arm $T^3$, so as to lift the bar $S^2$, and allow the bevel-wheel I' on the driving-shaft to be thrown out of gear with the pinion $I^2$ on the shaft J.

The operation of the parts described is as follows: Assuming that a piece of fabric has just been applied to the needles and that the guide E, plate F, and shears are in the positions shown in Fig. 6, the shaft J will then be out of gear with the driving-shaft I and the long arm of the lever Q will be raised to its full height, so that the ends of both of the levers N and P are raised, as shown in Fig. 20. The bar S is first moved outward, so as to bring the bevel-wheel I' into gear with the pinion $I^2$, the bar being retained in this position by the block S' on the bar $S^2$. The revolution of the crank-shaft now causes the reciprocation of the bar D, and as both bars L and M are free to move they are carried along with the said bar D, thereby moving the guide E and latch-turner F across the row of needles. As the bar D nears the limit of its movement in this direction it operates the lever $w'$ and notched arm $w$ so as to open the shears. The bar D is then moved back, and when said bar D and the bars L and M reach the limit of their movement in this direction the cam Q' will have released the long arm of the lever Q, which falls, thus causing the levers N and P to assume the positions shown in Fig. 18, locking the bar M in position, but leaving the bar L free to move with the bar D. The machine now runs on until the desired number of courses of stitches have been formed, when the cam Q' will raise the long arm of the lever Q, so as to permit the descent of the outer end of the lever N, thereby locking the bar L, carrying the guide. This elevation of the long arm of the lever Q also causes the depression of the outer end of the arm $x$, so that it is brought into the path of the finger $y$ and moved thereby, so as to throw back the bar V and release the arm $v'$, which falls and causes the closing of the shears and the cutting off of the thread. As the cam Q' raises the long arm of the lever Q still farther it causes the levers N and P to assume the positions shown in Fig. 20, releasing both of the bars L and M; but the arm $x$ has by this movement been lowered, so that it takes effect on the bar $T^3$ and throws the machine out of gear.

The parts are now in the position first described, ready for a renewal of the operation.

I claim as my invention—

1. The combination of the needles $a$, the coverers $e$, the fingers $e'$, the points $c$, the fingers $c'$, and devices for carrying the said coverers, points, and fingers, as specified.

2. The combination of the swinging frame G with the vertically-sliding plate G', carrying the points $c$, and a pivoted bar, $c^2$, provided with fingers $c'$, as described.

3. The combination of the swinging frame H with the pivoted plate H', carrying the coverers $e$, and the pivoted bar $e^2$, provided with fingers $e'$, as set forth.

4. The combination of the needles $a$, the frame H, and the coverers $e$ and fingers $e'$, carried thereby, with the frame G and the plate G', provided with a latch-turning plate, $d$, as specified.

5. The combination of the needles $a$ with the frame G and the plate G', having a latch-turning plate, $d$, and needle-supporting bar $d'$, as specified.

6. The combination of the swinging frame H, having its hooked bar $h^2$, with the plate G', having a pin, $h^3$, and the needle-bar B, having a hook, $h^4$, as set forth.

7. The combination of the needles $a$, the thread-guide E, the latch-turner F, occupying a position in advance of the work on the needles, and devices for operating said needles, guide, and latch-turner, whereby, as the needles are retracted, the open latches are acted upon by the latch-turner before they can catch in the projecting edge of the work, the closing of the latches and the proper casting of the work being thus insured, all as set forth.

8. The combination of the thread-guide E, the needles $a$, the selvage-hooks $i$, having downwardly-bent ends, the depressor-bars $b$, and devices for operating said parts, as set forth.

9. The combination of the needles $a$, the thread-guide E, the pair of shears, and devices for operating said parts, as described, with a spring-plate, $j^2$, located adjacent to the blade $j$ of the shears, and acting, in conjunction with the blade $j'$, to retain the end of the yarn after the same is severed, as set forth.

10. The combination of the bar D and devices for reciprocating the same with the bars L and M and the spring-arms L' and M', as set forth.

11. The combination of the bars L and M, having openings $l$ and $m$, with the bar D, spring-arms L' M', locking-levers N and P, and devices for operating said bar D and levers N and P, as set forth.

12. The combination of the levers N and P, the lever Q, a cam or pattern-chain, and devices, substantially as described, whereby the elevation and depression of the lever Q is caused to impart the within-described movements to the levers N and P, as set forth.

13. The combination of the levers N and P, having pins $n'$ and $p'$, the lever Q, having pins $n$ and $p$, devices for operating said lever Q, and the vertical post $q$, having a forked upper end, as set forth.

14. The combination of the bar D, the shears, the arm $w^2$, the lever $w'$, the notched bar $w$, and devices for operating said bar D, as specified.

15. The combination of the shears, the bar D, having a finger, $y$, the lever Q, having an arm, $x$, the bar V, and devices, substantially as described, for closing the shears on the movement of said bar, as set forth.

16. The combination of the bevel-wheel I', the pinion I$^2$, the bar D and its finger $y$, the lever Q and its arm $x$, the bar T$^3$, and devices, substantially as described, for releasing the bevel-wheel I' on the movement of said bar T$^3$, as specified.

In testimony whereof I have signed my name to this specification in the presence of two subscribing witnesses.

GEORGE JOHNSTONE.

Witnesses:
ALEXANDER PATTERSON,
HARRY SMITH.